United States Patent
Jaramillo

(10) Patent No.: US 8,380,912 B2
(45) Date of Patent: Feb. 19, 2013

(54) TRANSPARENT REPEATER DEVICE FOR HANDLING DISPLAYPORT CONFIGURATION DATA (DPCD)

(75) Inventor: Kenneth Jaramillo, Gilbert, AZ (US)

(73) Assignee: NXP B.V., Eindhoven (NL)

( * ) Notice: Subject to any disclaimer, the term of this patent is extended or adjusted under 35 U.S.C. 154(b) by 295 days.

(21) Appl. No.: 12/890,342

(22) Filed: Sep. 24, 2010

(65) Prior Publication Data

US 2012/0079162 A1 Mar. 29, 2012

(51) Int. Cl.
*G06F 13/20* (2006.01)
(52) U.S. Cl. .......................... 710/313; 345/1.1
(58) Field of Classification Search .......... 710/313–314, 710/105–106; 345/1.1
See application file for complete search history.

(56) References Cited

U.S. PATENT DOCUMENTS 8,237,624 B2 * 8/2012 Zeng et al. ...................... 345/1.1
2009/0279473 A1 11/2009 Lu et al.

OTHER PUBLICATIONS

'PS8121ED DisplayPort Repeater DisplayPort Signal Conditioner for Source Outputs,' Parade Technologies, Inc., Aug. 2008.
Texas Instruments; "DisplayPort 1:1 Dual-Mode Repeater—SN75DP120"; 27 pages (Oct. 2009).
Extended European Search Report for Application No. 11182042.9 (Jan. 20, 2012).

\* cited by examiner

*Primary Examiner* — Clifford Knoll

(57) ABSTRACT

Consistent with an example embodiment a repeater device is provided for handling signal transmissions, in particular in a DisplayPort environment. The repeater is to be coupled with an upstream device and a downstream device, the repeater being adapted for transmitting signals received from the upstream device to the downstream device and for conditioning the signals before transmission. The repeater is configured to provide a transparent communication path between the upstream device and the downstream device for DPCD access transactions belonging to a second group of DPCD access transactions. For DPCD access transactions belonging to a first group of DPCD access transaction, the repeater is configured to process the DPCD access transactions by accessing one or more DPCD registers included in the repeater.

24 Claims, 9 Drawing Sheets

US 8,380,912 B2

TRANSPARENT REPEATER DEVICE FOR HANDLING DISPLAYPORT CONFIGURATION DATA (DPCD)

FIELD OF INVENTION

The invention relates to a repeater device for handling DisplayPort signal transmissions. Further, the invention relates to a method of handling signal transmissions.

BACKGROUND

DisplayPort™ is a digital display interface standard put forth by the Video Electronics Standards Association (VESA) since 2006. It presents an audio/video interconnection scheme used primarily between a computer and its display monitor, or a computer and a home-theater system. The first version was approved in May 2006, version 1.1a was approved on Jan. 11, 2008, and the current version 1.2 was approved on Jan. 5, 2010.

DisplayPort is a high speed digital display interface standard which is starting to be widely adopted within the computer industry. DisplayPort supports a variety of device types from sources (video sources), sinks (ultimate destination for video/audio) and branches (splitters, concentrators, matrix switches, I/O switches, and repeaters). In many applications, Graphics Processing Units (GPU) within a device that serve as DisplayPort video sources are located quite far from the DisplayPort connectors. The distance is quite often far enough to result in degradation in the DisplayPort (DP) signal to such an extent that some sort of redriver or repeater is necessary to restore the signal at the connector to an ideal level.

There is a need for re-driver/repeater devices that allow GPUs to be designed for lower cost, lower power, and can restore potentially somewhat non-DP compliant signals to valid DP levels.

SUMMARY

In one embodiment, a repeater circuit is provided. The repeater circuit comprises a control circuit coupled to an upstream data interface, a downstream data interface, and a plurality of DisplayPort configuration data (DPCD) registers. The control circuit is configured to process DPCD access transactions received from the upstream data interface. DPCD access transactions included in a first list of DPCD access transactions are processed by accessing one or more of the plurality of DPCD registers. DPCD access transactions included in a second list of DPCD access transactions are processed by providing a transparent communication path to forward the transactions to the downstream data interface.

In another embodiment, a method of operating a repeater circuit is provided. A link configuration supported by both the repeater circuit and a downstream device coupled to the repeater circuit is determined. An upstream link between the repeater circuit and an upstream device coupled to the repeater circuit is configured and trained. The configured upstream link provides the determined link configuration supported by both the repeater circuit and the downstream device. A downstream link between the repeater circuit and the downstream device is configured and trained, the configured downstream and upstream links being symmetrical. Configuration data (DPCD) access transaction received from the upstream link are processed in a manner depending on the register to which access is requested. DPCD access transactions which request access to a DPCD register included in a first list of DPCD registers are processed by accessing one or more of a plurality of DPCD registers included in the repeater circuit. DPCD access requests which request access to a DPCD register included in a second list of DPCD registers are processed by providing a transparent communication path to the downstream link for the DPCD access transaction.

In another embodiment, a repeater circuit is provided. The repeater circuit comprises a control circuit coupled to an upstream data interface, a downstream data interface, and a plurality of DisplayPort configuration data (DPCD) registers. The control circuit is configured to operate in a link-configuration mode by processing DPCD access transactions related to link training, received from the upstream data interface, using one or more of the plurality of DPCD registers to configure a link for communicating between an external upstream device coupled to the upstream data interface and an external downstream device coupled to the downstream data interface. For one or more DPCD access transactions included in a second list of DPCD access transactions, the control circuit is configured to operate in a transparent-link-communication mode by providing a transparent communication path in the link between the external upstream device coupled to the upstream data interface and the external downstream device coupled to the downstream data interface.

According to another embodiment of the disclosure, a repeater for handling signal transmissions, in particular in a DisplayPort environment, is provided, wherein the repeater is to be coupled with a upstream device and a downstream device, the repeater being adapted for transmitting signals received from the upstream device to the downstream device and for conditioning the signals before transmission. The repeater is adapted for providing a direct branchless communication path between the upstream device and the downstream device, wherein the repeater is adapted for configuring a link between the repeater and the upstream device and/or a link between the repeater and the downstream device before transmission. The repeater is adapted for enabling the upstream device to direct access to the downstream device with regards to at least one predetermined functionality via the repeater.

According to a further exemplary embodiment of the disclosure, a communication system is provided comprising a repeater having the above mentioned features, an upstream device and a downstream device.

According to another exemplary embodiment of the invention, a method of handling signal transmissions via a repeater, in particular in a DisplayPort environment, is provided, wherein the repeater is to be coupled with an upstream device and a downstream device, the method comprising transmitting signals received by the repeater from the upstream device to the downstream device, conditioning the signals before transmission, providing a direct branchless communication path between the upstream device and the downstream device, configuring a link between the repeater and the upstream device and/or a link between the repeater and the downstream device before transmission, and enabling the upstream device to direct access the downstream device with regard to at least one predetermined functionality via the repeater.

According to still another exemplary embodiment of the disclosure, a program element (for instance a software routine, in source code or in executable code) is provided, which, when being executed by a processor, is adapted to control or carry out a signal handling method having the above mentioned features.

According to yet another exemplary embodiment of the disclosure, a computer-readable medium (for instance a CD, a DVD, a USB stick, a floppy disk or a harddisk) is provided, in which a computer program is stored which, when being executed by a processor, is adapted to control or carry out a signal handling method having the above mentioned features.

Handling signal transmissions which may be performed according to embodiments of the invention can be realized by a computer program, that is by software, or by using one or more special electronic optimization circuits, that is in hardware, or in hybrid form, that is by means of software components and hardware components.

The term "DisplayPort environment" may denote any environment which is used with a DisplayPort device. DisplayPort is a high speed digital display interface standard. The environment may be, for example, a system comprising a computer and its display monitor, or a computer and a home-theater system.

The above summaries of the present disclosure are not intended to represent each disclosed embodiment, or every aspect, of the present invention. Other aspects and example embodiments are provided in the figures and the detailed description that follow.

BRIEF DESCRIPTION OF THE DRAWINGS

The disclosure may be more completely understood in consideration of the detailed description of various embodiments of the disclosure that follows in connection with the accompanying drawings as follows.

Figure 1:
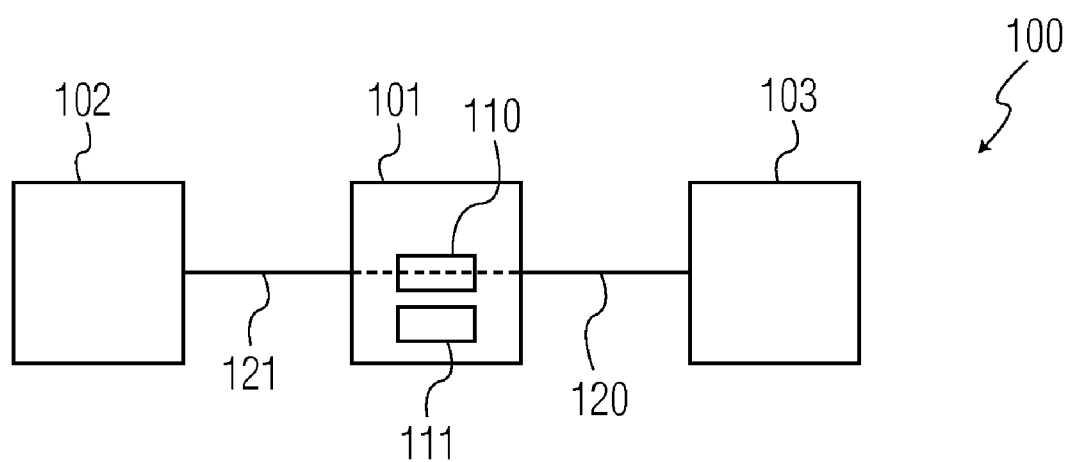
FIG. 1 illustrates a system with a repeater according to an exemplary embodiment of the disclosure.

The illustration in the drawings is schematic. In different drawings, similar or identical elements are provided with the same reference signs. While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

DETAILED DESCRIPTION

Modern audio and video standards require high performance transmission which is often limited in transmission length due to signal latency and signal degradation. A signal repeater allows a user to increase the distance between connected components so as to provide flexibility in the design of AV systems and the like. For example, in a user's application, the ultimate destination in an AV system may be in a different room from that of the source—at opposite ends of the living space. This application is referred to as an "Active Cable." Another example application is one of a docking station for laptops. DisplayPort uses very high speed signalling (5.4 Gbps). Sending this high speed video data over long distances on a motherboard (9" or so), input/output interfaces, through connectors, and cables often results in signal degradation. In one or more embodiments, a hardware efficient repeater circuit is provided for retransmission of signals.

One dominant audio video protocol standard is DisplayPort. DisplayPort supports communication between a variety of device types, such as, branches, splitters, concentrators, matrix switches, I/O switches, and repeaters. Many times, an internal Graphics Processing Units (GPU) serves as a DisplayPort video source. The GPU may be located quite far from the DisplayPort connectors. The distance is quite often far enough to result in degradation in the DisplayPort (DP) signal to such an extent that some sort of repeater is necessary to restore the signal at the connector to an ideal level. Inclusion of repeater devices allows GPUs to be designed for lower cost, lower power, and potentially somewhat non-DP compliance. A repeater restores the incoming signal to valid DP levels which allows the signal to be transmitted further. For ease of illustration, the embodiments examples disclosed herein are primarily discussed in terms of the DisplayPort standard. One skilled in the art will recognize that the embodiments are not so limited and may be used in compliance with a number of other audio and video protocols. As used herein, DisplayPort refers to the DisplayPort v1.2 standard issued by the Video Electronics Standards Association (VESA), which is incorporated by reference herein, and other protocol standards and versions forward or backward compatible therewith.

In one or more embodiments, a hardware efficient repeater circuit is provided which optimizes power, cost, and supported feature set.

For clarity some terminology as used herein is explained. The term "conditioning" may denote any kind of manipulation of the signal, wherein the content is not changed but the signal quality is improved. It may, for example, denote amplifying the signal.

The term "direct branchless communication path" may denote a line or connection between the upstream device and the downstream device via the repeater which is unbranched, i.e. does not comprise any branches. The repeater, therefore, may comprise exactly one single data input and one single data output. That means that the repeater may not comprise a video branching unit. The line may be used for transmitting communication data. The line may comprise a plurality of data pairs (lanes). The repeater may also provide a supply line for transmitting power or control signals. The communication line may be used for transmitting communication or payload data.

The terms "link" or "communication link" may denote in this context a logical connection between the repeater and the upstream device and/or the repeater and the downstream device. The logical connection may be configured in view of signal strength, capabilities of the devices, etc.

The term "functionality" may denote any kind of signal which may be transmitted from the upstream device to the downstream device, of which the downstream device has the capability to work with. It may also denote any kind of data which may be transmitted from the upstream device to the downstream device. Possible functionalities are multi-stream transport transfers or messaging packets, etc.

The terms upstream device or source device refer to a DisplayPort device which is closer to the original source of the video traffic in relation to the repeater. The terms "downstream device" refers to a DisplayPort device which is closer to the ultimate destination of the video traffic relative to the repeater. "Upstream link" refers to the communication link coupling the repeater to an upstream device and "downstream link" refers to the communication link coupling the repeater to a downstream device.

According to one or more embodiments, a DisplayPort repeater is provided which is transparent in behavior. Specifically, the embodiments define specific handling by a repeater device of accesses by upstream devices to registers of the repeater and its downstream DisplayPort devices.

The repeater, according to exemplary embodiments of the invention, optimizes power, cost, and feature set. The embodiments do not require a video branching unit for functionality. In one or more embodiments, capabilities of a downstream device are merged with that of the repeater to form a least common denominator.

Training is performed to achieve a symmetrical configuration of upstream and downstream links. After training is completed, established links may be used to forward in one or more types of access transactions in a transparent fashion, almost like a line re-driver. Most Native Aux (DPCD) transfers are transparently communicated to the downstream device. Different implementations may support transparent communication for different transactions. Implementation details are discussed in the following sections.

Repeaters are generally used in more complex video branching devices which require support for full video branching units (split incoming video streams into multiple output ports) and which required support for asymmetrical upstream and downstream configurations (i.e., devices which could support a different link rate and lane count on its upstream interfaces than on its downstream). According to one or more embodiments, it is sufficient to simply restore the degraded DisplayPort signal to valid levels. It is not necessary to support asymmetrical upstream and downstream links. The repeater may provide a transparent behavior at least in parts of its functions. The repeater may be adapted for providing symmetrical link configuration for the link between the repeater and the upstream device and for the link between the repeater and the downstream device. There is also no requirement for a video branching unit, that means "What video comes in goes out".

The link configuration may be based on functionality capabilities of the downstream device and the repeater. The link between the repeater and the upstream device and/or the repeater and the downstream device may be configured based on the functionalities which are provided by both. The functionalities may be, for example, high speed video lane count, high speed video link rate, etc.

The repeater may be adapted for determining functionality capabilities of the downstream device, for evaluating a least common denominator of the functionality capabilities of the downstream device and the repeater and for configuring the links based on the least common denominator of the functionality capabilities of the downstream device and the repeater. The repeater, according to the exemplary embodiments, is not a branch device. It has no video branching unit. It may merge the capabilities of its downstream device with that of its own to form a least common denominator. Therefore this repeater may only support identical upstream/downstream link configurations (both links must eventually train to same link configuration). It may support messaging, payload bandwidth management, topology assistance, etc. simply by its transparency. After training, the repeater is configured for transparent communication, almost like a line re-driver. Most Native Aux transfers may be passed to the downstream device.

The repeater may comprise registers, in particular DisplayPort configuration data registers, defining the DisplayPort capabilities. DisplayPort devices may have DisplayPort Configuration Data (DPCD) register spaces which define the DisplayPort related capabilities of the devices, the DisplayPort related status, and allow upstream devices the ability to control the behavior of downstream devices (for example, training each link prior to video traffic, sending messages between devices, etc.). As used herein, read or write commands to access DPCD registers of a sink device are referred to as a DPCD access transaction. The term upstream may refer to a DisplayPort device which is closer to the source of the video traffic. The term downstream may refer to a DisplayPort device which is closer to the ultimate sink of the video traffic. The repeater may handle different DPCD access transactions differently. The repeater may process a DPCD access transaction transparently by forwarding the transaction to the downstream device, or may process the DPCD access transaction non-transparently, by instead granting upstream devices access to one or more DPCD registers of the repeater. Forwarding in this context may mean transmitting data signals without modifying the content of the signals.

The repeater may comprise exactly two data interfaces formed by a first interface for communication with the upstream device and by a second interface for communication with the downstream device. The repeater therefore may provide a direct branchless communication line between the upstream device and the downstream device.

The repeater may be adapted for blocking direct access from the upstream device to the downstream device for at least one further predetermined functionality. This may be the case, for example, for functionalities which are not provided by the downstream device or the repeater device.

The repeater may be adapted for blocking direct access from the upstream device to the downstream device for DisplayPort configuration data (DPCD) transfers, in particular during configuration of the links. This may be the case for example for the functionality "Fast Aux". Since Fast Aux is optional, a repeater can't be totally transparent. A read by the DP upstream device to a register space (for example FAUX_CAP) may be the combination of the repeater's capabilities and the downstream device's capabilities. If either is not Fast Aux capable then the answer may be "Non FAUX Mode capable". In addition, if a repeater does not support Fast Aux, then any mistaken accesses to other Fast Aux (FAUX) related registers may not be passed down to the downstream device. Rather, they may be handled with an Aux_Nack for writes and Aux_Ack with 0's for reads. If Fast Aux is supported by the repeater and by the downstream device, the repeater may handle Fast Aux on both its upstream and downstream interfaces. It may support the training of the upstream link. Upstream FAUX training may most likely be followed by the repeater controlling training of the downstream FAUX link. Access by the upstream upstream device to the FAUX related DPCD registers may be assumed to be to the Repeater's local FAUX related DPCD registers. During training access by the upstream device may be to the repeater's registers. When the repeater trains its downstream Aux Channel for FAUX operation it may access the FAUX related DPCD registers of the downstream device. After training is completed, any use of FAUX to perform Aux Channel transfers (Native Aux transfers to access DPCD registers or I2C Over Aux transfers) may comply with the DisplayPort standard. When an Aux Channel FAUX transfer is handled locally by the repeater to access local resources (i.e., local DPCD register), the DP 1.2 specification may be followed as far as FAUX protocol support. When an Aux Channel FAUX transfer is passed through the repeater to the downstream device then the repeater may pass the transfer to its downstream interface as a FAUX transfer. This may facilitate potential use of USB over FAUX.

The upstream device and the downstream device may comprise registers, in particular DisplayPort configuration data registers, defining the DisplayPort capabilities. Also the upstream device and the downstream device may comprise DisplayPort Configuration Data (DPCD) register spaces which define the DisplayPort related capabilities of the devices, the DisplayPort related status, and allow upstream devices, i.e., the source device, the ability to control the behavior of downstream devices, i.e., the downstream device (for example, training each link prior to video traffic, sending messages between devices, etc.).

In one or more embodiments, the repeater is configured for forwarding predetermined signals or signals relating to predetermined functionalities from the upstream device to the downstream device and/or from the downstream device to the upstream device, wherein the repeater may be adapted for receiving and communicating data transparently. In other words, the repeater does not change the transmitted data packets or signals. The repeater may be completely transparent in its appearance. In the following, the predetermined signals are explained in more detail.

The repeater may be adapted for forwarding data packets relating to messaging from the upstream device to the downstream device. Forwarding in this context may mean transmitting without making any changes to the data packets. The upstream device may therefore access the DPCD register of the downstream device directly in respect of messaging. That means that the repeater may be completely transparent in this case, as if it would not be there. The data packets may be sent via the AUX channel. The repeater thus may support messaging in a different manner than known by its transparency to the Aux Channel's Native Aux Command access of the DPCD register space relating to messaging. The assumption is that when an upstream device sends the various messaging packets that they are meant for non-repeater devices. Accesses from a upstream device to DPCD registers MSTM_CAP, MSTM_CTRL, DOWN_REQ, UP_REP, DOWN_REP, and UP_REQ are simply passed through by a repeater to its downstream device. For example, when a upstream device writes to the DOWN_REQ space, a repeater simply forwards these transactions to the downstream device. When the downstream device updates its DOWN_REP and asserts IRQ_HPD, the repeater forwards the IRQ_HPD to the upstream device and then passes the subsequent reads by the upstream device to the downstream device's DOWN_REP address.

In one or more embodiments, the repeater is configured to enable the upstream device to access the DPCD registers of the repeater during configuring or training of the communication links between the upstream device and the repeater and the downstream device and the repeater. A transparent repeater has to handle the Link Training related DPCD registers very carefully. During link training, the repeater device handles Aux Channel Native Aux transactions to the training related registers (LINK_BW_SET, LANE_COUNT_SET, TRAINING_PATTERN_SET, LANE0_1_STATUS, etc. . . . ) as accesses to its own local DPCD registers. After training is completed, accesses to these registers may be handled transparently by passing them down to the downstream device.

The repeater may be adapted for configuring or training the link between the upstream device and the repeater before the link between the downstream device and the repeater. The repeater may be further adapted for reconfiguring the link between the upstream device and the repeater if the configuration of the link between the downstream device and the repeater fails. The upstream interface of the repeater is trained before the downstream interface. Should the downstream interface fail to train to the same configuration (link rate and lane count) as the upstream link, then the upstream link must be retrained to match the downstream link's configuration. One skilled in the art will recognize that retraining may be implemented in a number of ways. One way would be for the repeater to clear its training status (i.e. LANE0_1_STATUS=0'S, etc.), assert an unplug/replug event to the upstream device and modify its capability registers to match the next lower bit rate from the previously requested bit rate on the upstream interface. Another way would be to clear its training status, assert an IRQ_HPD, and then manage link training (withhold passing status) until the next lower bit rate is achieved (from the previously requested bit rate that the upstream link trained to).

The repeater may be adapted for passing data relating to Payload Bandwidth Allocation from the upstream device to the downstream device. The repeater may support Payload Bandwidth Allocation in a novel manner by its transparency to the Aux Channel's Native Aux Command access of the DPCD register space relating to Payload Bandwidth Allocation. Native Aux accesses to DPCD Payload Bandwidth related registers (PAYLOAD_ALLOCATE_SET, PAYLOAD_ALLOCATE_TIME_SLOT_COUNT, PAYLOAD_TABLE_UPDATE_STATUS, etc. . . . ) may simply be passed through by a repeater to its downstream device.

The repeater may be adapted to pass access transactions to DPCD registers related to Topology Management/Assistance from the upstream device to the downstream device. The repeater may support Topology Management/Assistance in a novel manner by its transparency to the Aux Channel's Native Aux Command access of the DPCD register space relating to DisplayPort Topology. For the most part these are just the Messaging related registers from the previous paragraph, but they are also the DisplayPort Capability registers as well (NORP, DOWNSTREAMPORT_PRESENT, RECEIVE_PORT0_CAP_0, etc. . . . ). Native Aux accesses to Topology Management/Assistance DPCD registers may be passed down to the repeater's downstream device.

In one example embodiment, the repeater is configured to pass access transactions to DPCD registers relating to Power Management from the upstream device to the downstream device. The repeater may support DisplayPort Power Management in a special manner by its transparency to the Aux Channel's Native Aux Command access of the DPCD register space relating to Power Management. For the most part, these are just the Messaging related registers from the previous paragraph. But they are also the DPCD SET_POWER register as well. Native Aux accesses to Power Management DPCD registers may be passed down to the repeater's downstream device. Note that besides passing down writes to the SET_POWER register, a transparent repeater may also update its local DPCD register as well and act in accordance with the data written.

The repeater may be adapted for passing accesses relating to Event Status Indicator from the upstream device to the downstream device. The DP 1.2 standard says that MST devices should use the Event Status Indicator Space in DPCD rather than the normal 0x200 space. The standard says further that an MST Source device must read the ESI field at 02002h-

0200Fh when it receives an IRQ_HPD pulse instead of the Sink Status field (00200h region) as the ESI field allows all the necessary Device and Link status information including Rx capability change and Link Status change in a single Native Aux RD transaction. A DP 1.2 device should mirror the contents of 0x200-0x205 to the ESI space. If a branch or repeater wants to use the ESI feature of telling the upstream device that its capability changed (e.g., downstream link failed to train to the same configuration as the upstream and repeater wants to retrain the upstream link by changing its LINK_RATE capability to the next lower value) then it would have to use the UPSTREAM_IS_SRC DPCD bit to determine if the upstream device would use the ESI space. If this bit is written by the upstream device, the repeater can assume that the ESI space would be used. A repeater would update the ESI range only for registers which it considers local. Further, a repeater does not consider any of these registers local except for the LANEX_X_STATUS_ESI and LANE_ALIGN_STATUS_UPDATED_ESI registers. That means that it would forward all accesses to the ESI registers (except LANEX_X_STATUS_ESI and LANE_ALIGN_STATUS_UPDATED_ESI) to the downstream device. For LANEX_X_STATUS_ESI and LANE_ALIGN_STATUS_UPDATED_ESI registers, they would be handed the same as the LANE_X_X_STATUS and LANE_ALIGN_STATUS_UPDATED registers located from address 00202H to 00204H). The only exception would be to fool the upstream device into retraining the repeater's upstream link to a lower capability.

FIG. 1 illustrates a system 100 comprising a repeater 101, a first or upstream device 102, for example a video source, and a second or downstream device 103, for example a display device according to an exemplary embodiment of the invention. The repeater is to be coupled with the upstream device, in the following also called source device, via upstream link 121 and to the downstream device, in the following also called destination device via downstream link 120. The repeater comprises a conditioning unit 111 for conditioning the signals before transmission, for example for amplifying. The repeater is adapted for providing a direct branchless communication line between the upstream device and the destination device via unit 110. The repeater is adapted for configuring the link 121 between the repeater and the upstream device and/or the link 120 between the repeater and the destination device before transmission. The repeater is further adapted for enabling the upstream device to directly access the destination device with regard to at least one predetermined functionality via the repeater. This may be performed via the unit 110. Units 110 and 111 may be integrated on one single chip.

The repeater may be used in a DisplayPort environment. DisplayPort is a high speed digital display interface standard which is starting to be widely adopted within the computer industry. It has several advantages over standards such as HDMI/DVI and VGA as discussed above. DisplayPort supports a variety of device types from Sources (video sources), Sinks (ultimate destination for video/audio) and Branches (Splitters, Concentrators, Matrix Switches, I/O Switches, and Repeaters). In some implementations, a Graphics Processing Units (GPU) within a device serves as a DisplayPort video source located quite far from the DisplayPort connectors. The distance is quite often far enough to result in degradation in the DisplayPort signal to such an extent that some sort of redriver or repeater is necessary to restore the signal at the connector to an ideal level. Inclusion of the repeater device allows GPUs to be designed for lower cost, lower power, and potentially somewhat non-DP compliant. The repeater then is expected to restore the incoming signal to valid DP levels.

DisplayPort devices include DisplayPort Configuration Data (DPCD) register spaces that define the DisplayPort related capabilities of the devices, the DisplayPort related status, and allow upstream devices the ability to control the behavior of downstream devices (i.e., training each link prior to video traffic, sending messages between devices, etc. . . . ). The term upstream refers to a DisplayPort device which is closer to the source of the video traffic. The term downstream refers to a DisplayPort device which is closer to the ultimate sink of the video traffic.

The repeater according to exemplary embodiments is a repeater of a class of DisplayPort 1.2 repeater devices which is transparent in behavior. Specific handling by these repeater devices of accesses by upstream devices to the DPCD space of the repeater and its downstream DisplayPort devices is defined.

Figure 9:
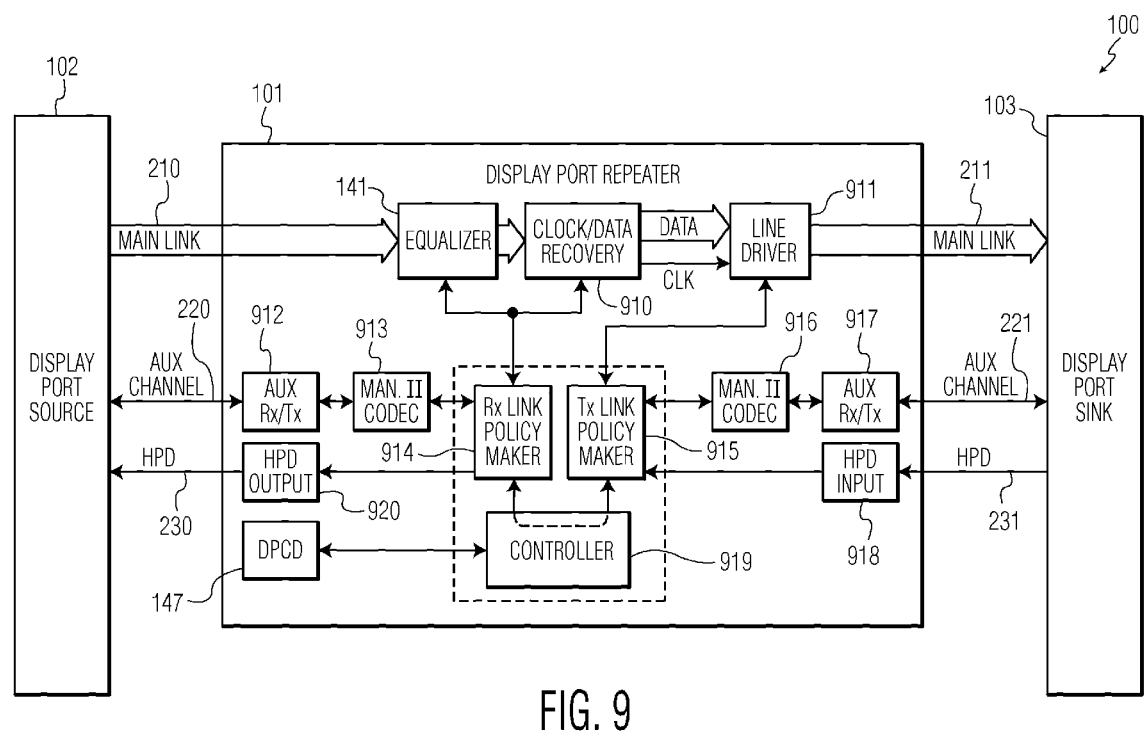
FIG. 9 illustrates a repeater according to an embodiment of the disclosure.

FIG. 9 shows a more detailed exemplary embodiment 100 of a repeater 101 to be coupled with an upstream device 102 and a downstream device 103. The repeater includes Link Policy Makers 914, 915 and Controller 919 to control the processing of DCPD access transactions. These are typically implemented in S/W but could be implemented by H/W state machines.

The repeater comprises a DCDP register 147 which is accessed by the controller. The repeater comprises further common units like HPD output and HDP input units, 918, 920, AUX receiving and transmitting units, 912, 917, coding units 913, 916, an equalizer 141, a clock/data recovery unit 910 and a line driver 911.

Repeaters have generally been used in more complex video branching devices which needed to support full video branching units (split incoming video streams into multiple output ports) and which needed to support asymmetrical upstream and downstream configurations (i.e., devices which could support a different link rate and lane count on its upstream interfaces than on its downstream).

Figure 2:
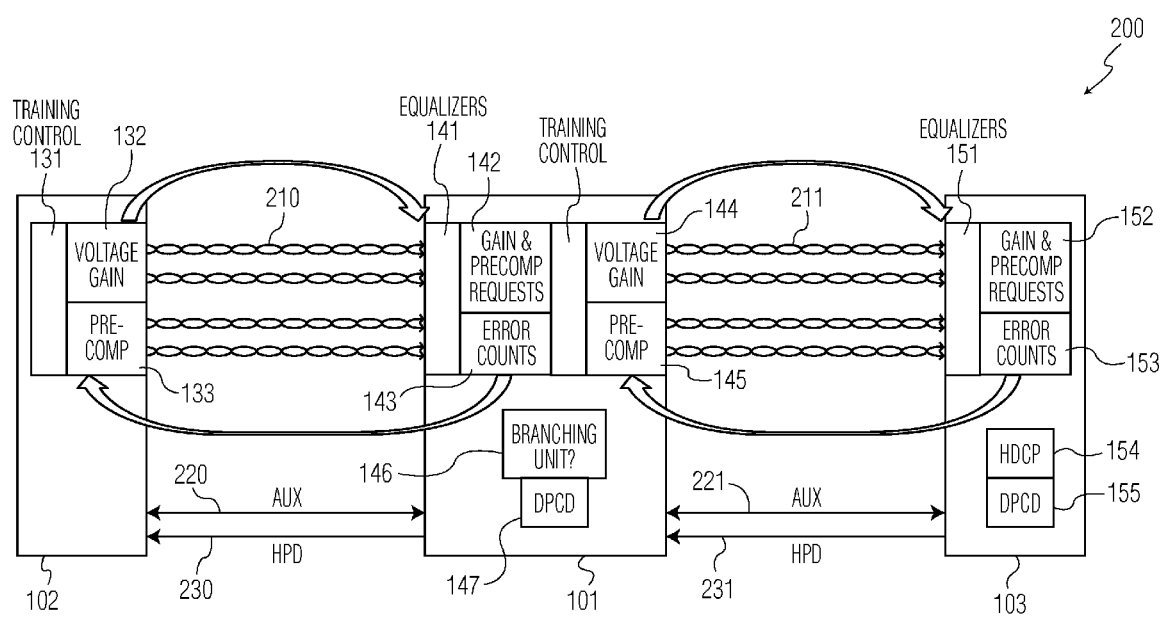
FIG. 2 illustrates an example system.

FIG. 2 illustrates a communication system 200 comprising a upstream device 102, a repeater 101 and a destination device 103. The upstream device 102 comprises a training control unit 131, a precompensation unit 133 and a voltage gain unit 132. These units are used for training the main DisplayPort link (finding optimal voltage/pre-emphasis settings) and driving video stream data in a reliable manner.

The repeater 101 comprises an equalizer 141, a "gain and precompensation requests" unit 142, an error count unit 143, a precompensation unit 145, a voltage gain unit 144 and a training control unit. The repeater may also comprise a video branching unit 146 for supporting more than one destination device. The repeater further comprises a DPCD unit 147.

The destination device 103 comprises an equalizer 151, a "gain and precompensation requests" unit 152, an error count unit 153, a DPCD unit 155 and a HDCP unit 154.

The repeater communicates with the upstream device and the destination device. A high speed main link between the repeater and upstream device (210) and between the repeater and Destination (211) is used for video stream transmission. An Auxiliary Channel between the repeater and upstream device (220) and between the repeater and Destination (221) is used for access by the upstream device to downstream device DPCD registers as well as other communication features. Hot Plug Detect (HPD) signals between the repeater and upstream (230) and between the repeater and Destination (231) is used to allow downstream devices to signal plugin/removal of devices as well as signaling interrupts.

Figure 3:
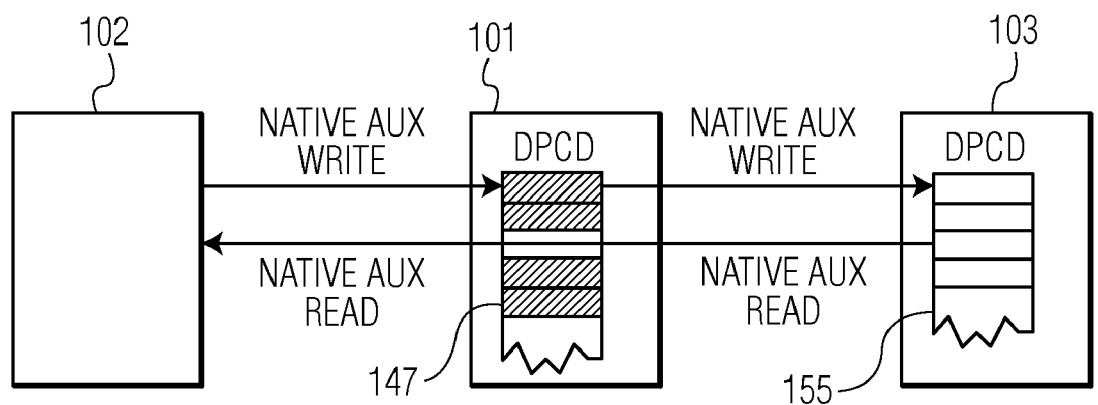
FIG. 3 illustrates a possible communication between an upstream device, a repeater and a destination device.

FIG. 3 illustrates an example of transparent processing of DPCD access transactions in accordance with one or more embodiments of the invention. FIG. 3 shows a block diagram of the system 100 shown in FIG. 1. Repeater circuit 101 is shown processing read and write DPCD access transactions from upstream device. The upstream device 102 is shown performing a reading or writing to the DPCD register 155 of its downstream device 103. For many DPCD access transactions, the repeater 101 is transparent and for other DPCD access transactions it is not. If the repeater is transparent, the upstream device accesses directly to the DPCD register of the destination device. It the repeater is not transparent, the upstream device accesses the DPCD register 147 of the repeater and the repeater accesses the DPCD register 155 of the destination device.

A repeater according to one or more exemplary embodiments of the invention provides a balance of power dissipation, hardware complexity, software complexity, cost, and feature set capabilities. These DisplayPort 1.2 repeater embodiments are not optimized for branch devices and do not include a video branching unit. Capabilities of its downstream device may be merged with that of the repeater to form a least common denominator. Therefore this type of repeater supports identical upstream/downstream link configurations (both links must eventually train to same link configuration.). It supports messaging, payload bandwidth management, topology assistance, and other advanced feature set capabilities simply by the transparency of the repeater. After training, the repeater basically disappears, almost like a line re-driver. Most Native Aux (DPCD) transactions are passed to the downstream device. Which transactions go to repeater DPCD as opposed to downstream device DPCD will be discussed in the following sections.

Figure 6:
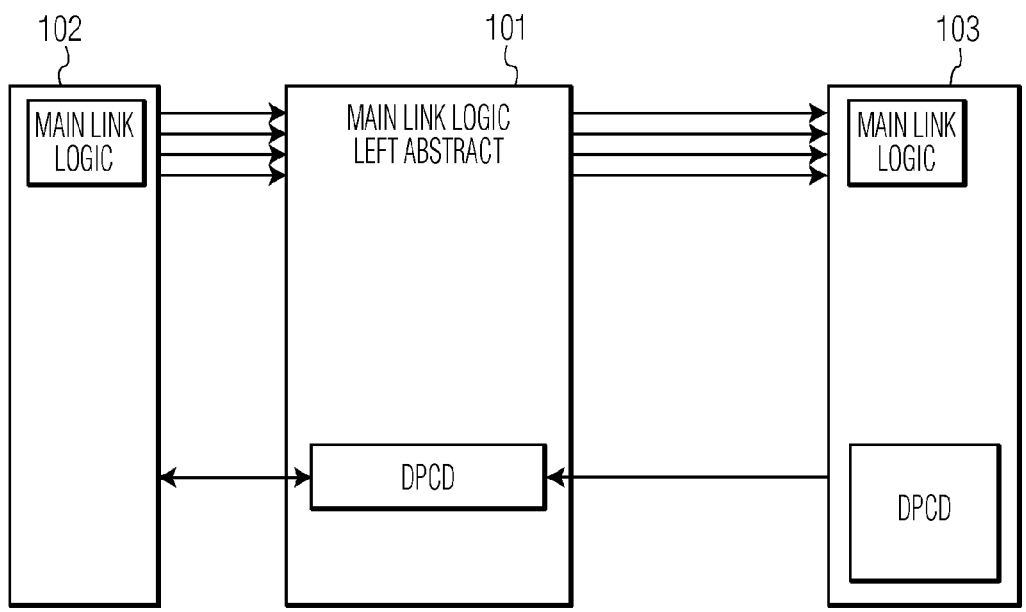
FIG. 6 illustrates a repeater according to an embodiment of the disclosure.

FIG. 6 shows an example of a register access transaction that is processed in a non-transparent manner. The DPCD register value is retrieved from downstream device 103 and used to update a local DPCD register in repeater 101. When an access transaction from upstream device 102 requests access to the DPCD register in downstream device 103, the repeater uses the local register in repeater 101 to process the transaction.

Figure 7:
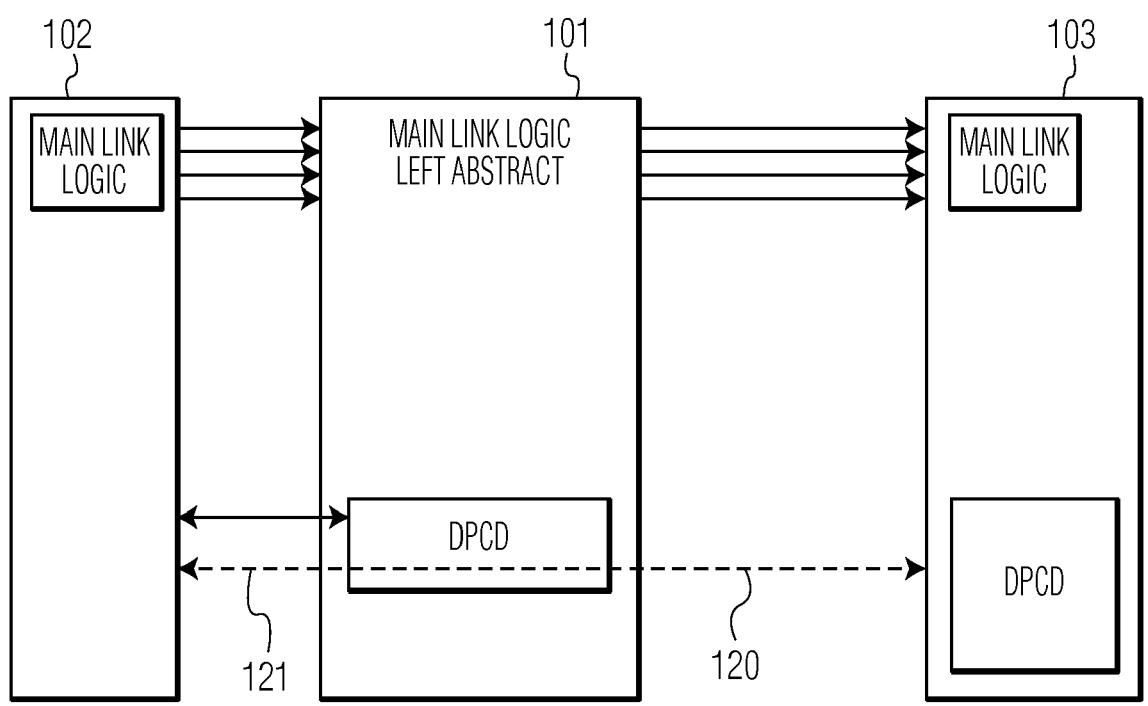
FIG. 7 illustrates a repeater according to an embodiment of the disclosure.

The repeater may be configured to process access transactions to one or more DPCD registers non-transparently. For example, in one embodiment, DPCD access transactions related to link training are processed non-transparently while the links are being configured and trained. Once link configuration is completed DPCD access transactions are transparently communicated to the downstream device FIG. 7 shows an example repeater circuit configured in accordance with one embodiment. In this example embodiment, the repeater circuit 101 received DPCD access transactions from upstream device 102. As illustrated by the solid line from upstream device 102 to DPCD register, prior to configuring the upstream and downstream communication links, access transactions from the upstream device related to link training are processed non-transparently, allowing the upstream device 102 access only to local DPCD registers located on the repeater 101. Once link configuration is completed, link training access transactions from the upstream device related to link training are processed transparently—forwarding the DPCD access transactions to the downstream device (as shown by dashed links 121 and 120).

Figure 4:
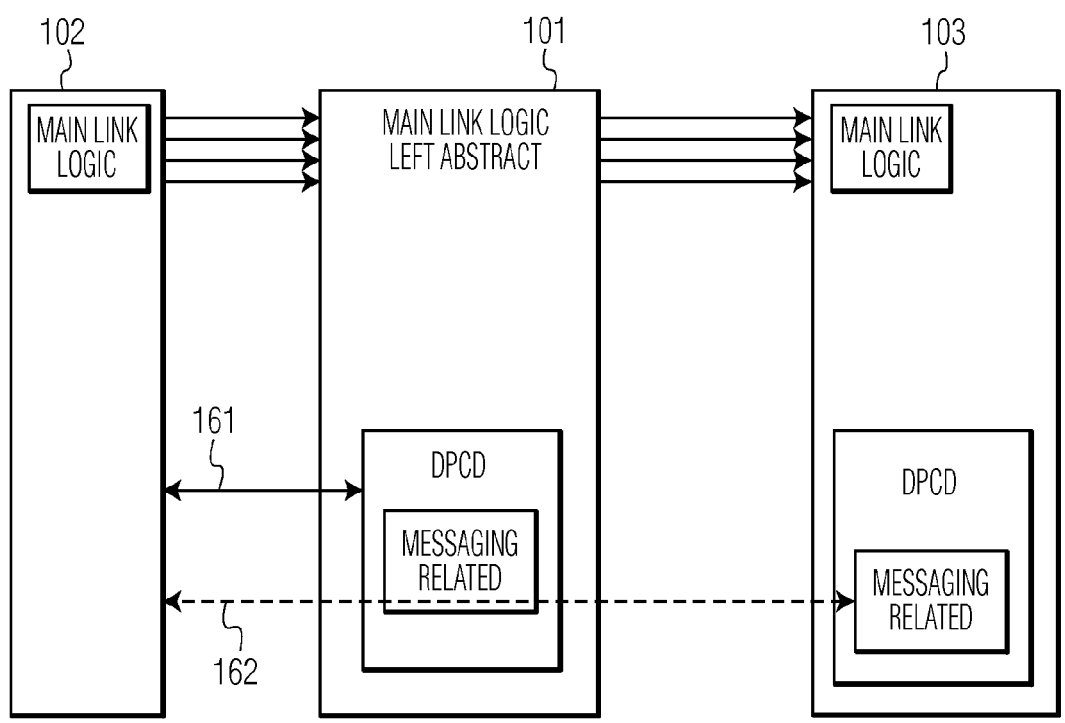
FIG. 4 illustrates a repeater according to an embodiment of the disclosure.

One skilled in the art will recognize the different register access transactions may be processed transparently or non-transparently depending on the implementation. For example, FIG. 4 shows an example repeater circuit configured in accordance with one embodiment. In this example, the repeater circuit 101 is configured to provide a transparent communication path 162 to downstream device 103 for all messaging transactions received by DPCD upstream device 102.

Figure 5:
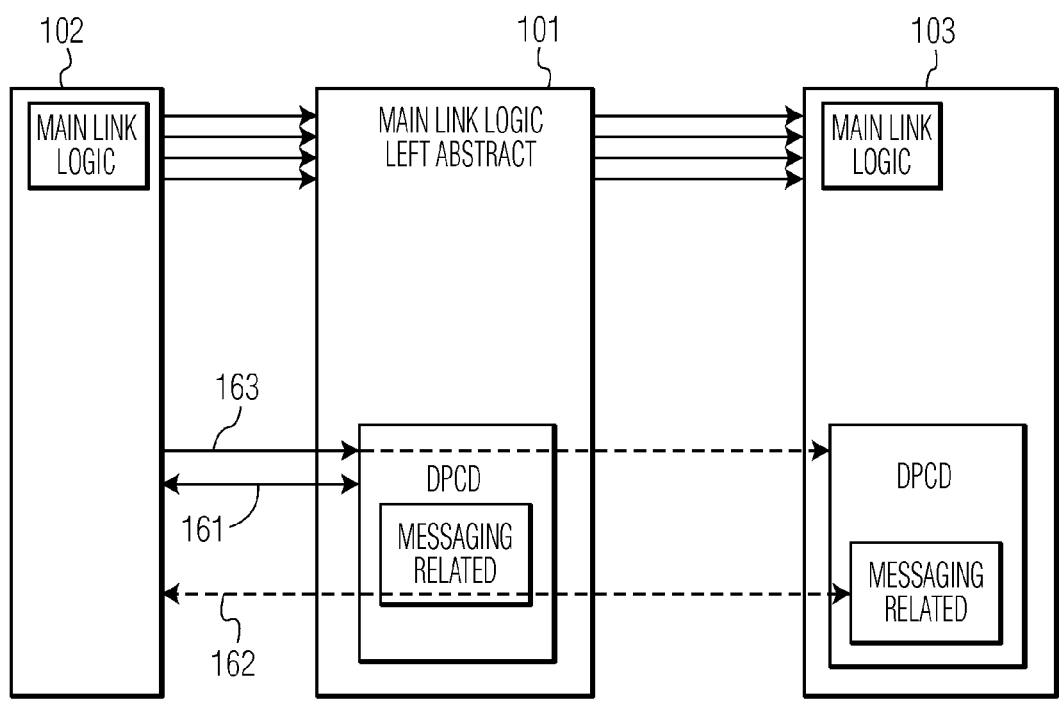
FIG. 5 illustrates a repeater according to an embodiment of the disclosure.

One skilled in the art will recognize that access to a DPCD register does not need to be processed exclusively using a register within the repeater or exclusively using a register of the downstream device. FIG. 5 illustrates the repeater circuit of FIG. 4 additionally processing a register access transaction 163 using registers in both the repeater 101 and the downstream device 103. As one example, access transactions to power management registers may provide a transparent communication path to downstream device 103 to update the power configuration of the device. While forwarding the access transaction, the repeater may use the forwarded access transaction to update the power configuration of the repeater circuit 101. This may be referred to a "snooping." After the repeater updates its register, if appropriate, the repeater may adjust power management settings appropriately.

Figure 8:
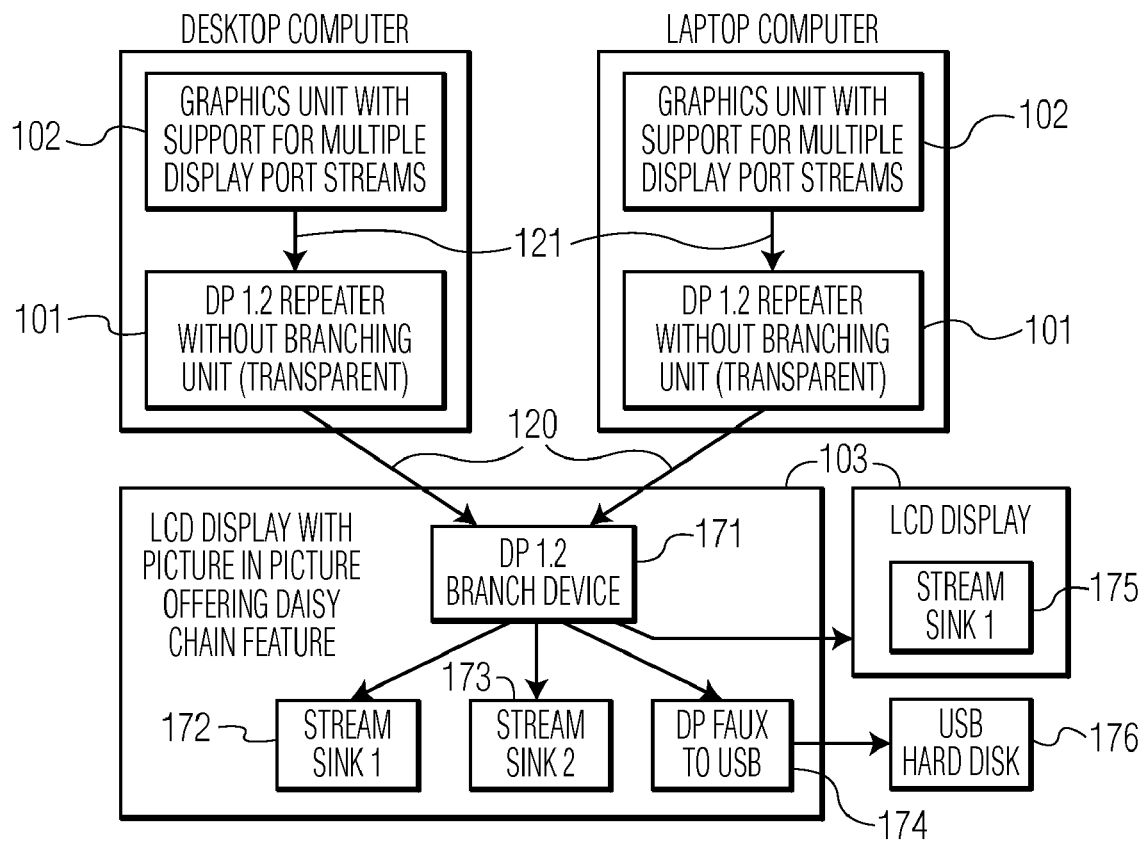
FIG. 8 illustrates a system using a repeater according to an exemplary embodiment of the disclosure.

FIG. 8 shows an example usage model of a repeater 101 according to an embodiment of the invention. In this case, there are two computers connected to dual displays via DisplayPort links 120, 121. The sources in these computers may utilize graphics processing units 102 which support multiple video streams. They may be located on the motherboard far enough away from the DisplayPort connector that the DisplayPort signal is degraded to such a point that a repeater is needed to restore the signal. The primary display device 103 shown supports multiple DisplayPort inputs allowing multiple video sources (multiple computers, DVD players, etc. . . . ) to display content on the display. The primary display device comprises a DP 1.2 branch device 171 for dividing the incoming signals to a plurality of sink devices 172, 173, 174. Each DisplayPort link may support multiple video streams as well. This provides the ability to display multiple display images on each monitor. One example is picture in picture. The primary display shown offers a daisy chain feature allowing a second display 103, 175 to be connected. Another possible feature would have the display offer a DisplayPort to USB conversion 176 allowing the connection of an external hard disk near the display.

In the following paragraphs, some general behaviors for the repeater according to an exemplary embodiment of the invention are explained. The repeater 101 and the corresponding links are discussed in relation to FIG. 7.

1) Messaging: The repeater is pretty much invisible as far as the upstream device is concerned. This goes for everything about messages. A repeater does not have to examine the packet (messaging packet on Aux Channel that is) and understand anything. The assumption is that when a upstream device sends the various packets, they are meant for non-repeater devices. Accesses from a upstream device to MST-M_CAP, MSTM_CTRL, DOWN_REQ, UP_REP, DOWN_REP, and UP_REQ are simply passed through by a repeater to its downstream device. For example, when a upstream device writes to the DOWN_REQ space, a repeater simply forwards these transactions to the downstream device. When the downstream device updates its DOWN_REP and asserts IRQ_HPD, the repeater forwards the IRQ_HPD to the upstream device and then passes the subsequent reads by the upstream device to the downstream device's DOWN_REP address.

2) Training Related Registers: LINK_BW_SET, LANE_COUNT_SET, TRAINING_PATTERN_SET, LANE0_1_STATUS, etc. Since the upstream link is trained first followed by downstream link training, accesses by a upstream device to these registers during link training results in the repeater's DPCD registers being accessed. The repeater may use the information from the training of the upstream interface to train the downstream interface (LINK_BW_SET and LANE_COUNT_SET). After link training is complete all accesses to the training related status registers (LANE0_1_STATUS, LANE_ALIGN_STATUS_UPDATED, etc. . . . ) are passed downstream so that the downstream device's registers are accessed. For example, after link training, if the downstream device loses lock and asserts IRQ_HPD, the repeater will pass the IRQ_HPD to the upstream device. Subsequent DPCD reads may result in the repeater passing them to the downstream device. An alternative could be that the repeater responds to the IRQ_HPD by reading the downstream devices status registers (DPCD addresses 0x200-0x205 and ESI registers) and updates its local DPCD registers to match. Then subsequent DPCD reads to these locations by the upstream device may result in the repeater passing its local data in the aux transfers.

3) Retraining: The upstream interface of the repeater may be trained before the downstream interface. Should the downstream interface fail to train to the same configuration (link rate and lane count) as the upstream link, then the upstream link can be retrained to match the downstream link's configuration. One way to do this would be for the repeater to clear its training status (i.e., LANE0_1_STATUS=0'S, etc.), assert an unplug/replug event to the upstream device and modify its capability registers to match the next lower bit rate from the previously requested bit rate on the upstream interface. Another way would be to clear its training status, assert an IRQ_HPD, and then manage link training (withhold passing status) until the next lower bit rate is achieved (from the previously requested bit rate that the upstream link trained to).

4) Bandwidth Allocation: Because this type of repeater supports symmetrical upstream and downstream link configurations (i.e., downstream link configured to same bit rate and lane count as upstream) Payload bandwidth allocation is not required. The repeater is transparent as far as the upstream device is concerned. As part of the process of the upstream device starting up, multistream transport, and allocating bandwidth, accesses to PAYLOAD_ALLOCATE_SET, PAYLOAD_ALLOCATE_TIME_SLOT_COUNT, PAYLOAD_TABLE_UPDATE_STATUS, etc. . . . are simply passed through by a repeater to its downstream device.

5) Power Management: The POWER_DOWN_PHY/POWER_UP_PHY messages are directed at non-repeater devices. For example, when a upstream device sends a POWER_DOWN_PHY message, it is sending it to the downstream device from the repeater. That device then handles the message as appropriate. When the POWER_DOWN_PHY message has been handled and the upstream device wants to then power down the last DP device (the one closest to the upstream device), the write to the SET_POWER register would not only be passed down to a repeater's downstream device, but would also be acted on by the repeater as well.

6) Fast Aux: Since Fast Aux is optional a repeater is not totally transparent. A read by the upstream device to FAUX_CAP can be the combination of the repeaters capabilities and the downstream device's capabilities. If either is not Fast Aux capable then the answer is "Non FAUX Mode capable". In addition if a repeater does not support Fast Aux then any mistaken accesses to other FAUX related registers should not be passed down to the downstream device. Rather, they can be handled with an Aux_Nack for writes and Aux_Ack with 0's for reads. If Fast Aux is supported by the repeater and by the downstream device then the repeater can handle Fast Aux on both its upstream and downstream interfaces. It can support the training of the upstream. Upstream FAUX training can be followed by the repeater controlling training of the downstream FAUX link. Access by the upstream upstream device to the FAUX related DPCD registers can be assumed to be to the repeater's local FAUX related DPCD registers. During training, access by the upstream device is to the repeater's registers. When the repeater trains its downstream Aux Channel for FAUX operation it accesses the FAUX related DPCD registers of the downstream device. After training is completed, any use of FAUX to perform Aux Channel transfers (Native Aux transfers to access DPCD registers or I2C Over Aux transfers) can comply with the DisplayPort standard. When an Aux Channel FAUX transfer is handled locally by the Repeater to access local resources (i.e., local DPCD register), the DP 1.2 spec can be followed as far as FAUX protocol support. When an Aux Channel FAUX transfer is passed through the repeater to the downstream device, then the Repeater can pass the transfer to its downstream interface as a FAUX transfer. This is to facilitate potential use of USB over FAUX.

7) GUID: A repeater that does not require a video branching unit does not require a GUID.

8) Event Status Indicator Space in DPCD a) DP 1.2 standard says that MST devices should use this rather than the normal 0x200 space. The standard says further that an MST Source device must read the ESI field at 02002h-0200Fh when it receives an IRQ_HPD pulse instead of the Sink Status field (00200h region) as the ESI field allows all the necessary Device and Link status information including Rx capability change and Link Status change in a single Native Aux RD transaction.

b) A DP 1.2 device should mirror the contents of 0x200-0x205 to the ESI space. If a branch or repeater wants to use ESI feature of telling the upstream device that its capability changed (i.e., downstream link failed to train to the same configuration as the upstream and repeater wants to retrain the upstream link by changing its LINK_RATE capability to the next lower value), it would have to use the UPSTREAM_IS_SRC DPCD bit to determine if the upstream device would use the ESI space. If this bit is written by the upstream device, the repeater can assume that the ESI space would be used.

c) A repeater would update the ESI range only for registers which it considers local. A repeater does not consider any of these registers local except for the LANEX_X_STATUS_ESI and LANE_ALIGN_STATUS_UPDAT- ED_ESI registers. That means that it would forward all accesses to the ESI registers (except LANEX_X_STATUS_ESI and LANE_ALIGN_STATUS_UPDATED_ESI) to the downstream device. For LANEX_X_STATUS_ESI and LANE_ALIGN_STATUS_UPDATED_ESI registers, they would be handled the same as the LANE_X_X_STATUS and LANE_ALIGN_STATUS_UPDATED registers located from DPCD address 00202H to 00204H). The only exception would be to fool the upstream device into retraining the repeater's upstream link to a lower capability.

d) Repeater Retraining to Get Lower Link Rate: A sink device can update ESI RX_CAP_CHANGED in LINK_SERVICE_IRQ_ESI0 register to indicate that the upstream device needs to reread its capability information. This could be how a sink indicates to a upstream device that it desires to receive a stream in SST format. For the most part, a repeater doesn't care about this because this would be transparent to it. However, if the repeater needs to retrain the upstream link at a lower rate than originally trained to (downstream link fails to train to upstream link rate) then it may need to update these DPCD locations to fool the upstream device into training it to a lower rate.

9) Global Time Code (GTC) Support: The repeater is not transparent when it comes to this. A repeater may need to support GTC Master/Slave functionality on its upstream and downstream aux channels.

10) Link Training—2 Step Approach: It may be expected that most repeaters perform link training of their upstream and downstream links in a two step approach, with the upstream being trained first followed by the downstream. With this approach the upstream device may start Aux traffic, which the repeater is not ready for since it may still be busy training its downstream link. The repeater may expect these aux transfers and may be able to multiplex between its own downstream Aux transfers supporting link training and the ones from the upstream device.

11) Compliance Testing: Compliance testing of this type of repeater may be done at the downstream interface of the repeater.

In the following, some remarks are made in respect of the DPCD registers. Some registers may be not contained in the repeater but only in the downstream device, i.e., in the destination device. Therefore, accesses are passed to the destination device without the repeater interpreting what's in the contents of the data signals, for example read or write data.

If a register is contained in both the repeater and the destination device, accesses, for example reads, may be a combination of the lowest common capability between the repeater and the destination device.

If a register is contained in both the repeater and the destination device, accesses to this register may be not transparent. For example, during Global Time Code (GTC) operations, the upstream device may interact with the repeater and involve the repeaters GTC related registers. The repeater also may utilize these registers when it acts as GTC master and talks to the destination device to involve the use of the destination device's GTC related registers.

In the following table, an example is shown how DPCD access transactions to different DPCD registers from the upstream device may be handled by the transparent repeater according to one example embodiment of the invention. The table shows DPCD registers included in the DisplayPort 1.2 specification, its address, whether the repeater has a local version of each register (implying local information such as DP rev, max link rate, etc. . . . ), whether the repeater passes reads/writes to each register downstream, and whether repeater snoops writes to registers which are downstream.

The following should be kept in mind when looking at the table:

The repeater containing a local version of a specific DPCD register implies that it needs local information such as DP rev, max link rate, etc. . . .

If the repeater does not have a local version of the register but reads/writes to the register get passed down to the downstream device, this implies that the downstream register is the 'master' register. Reads from it will be AUX_DEFER'd until a read can be completed from the downstream device. Then the read data will be returned to the upstream device.

If the repeater has a local version of a specific register but reads/writes get passed down then this implies that a combination of the repeater's and the downstream device's register is used during reads. For example, the max link rate should be the lowest between the repeater and its downstream device.

If the repeater has a local version of a DPCD register and reads/writes do not get passed down then this implies that the upstream device really does not see the downstream device's DPCD register. This is true for the training related registers during link training because the upstream link is trained separately from the downstream link.

In the table, numbers are used for explaining specific characteristics of the different address and repeater handlings.

In the "has local DPCD for this reg." column, no number with checkmark implies that the repeater, also called DP 1.2 Repeater, has a local version of the DPCD register. No checkmark implies that it does not.

"1" with checkmark implies that DP 1.2 Repeater as well as the downstream device has the specific register and that access to the registers is not transparent. For example, during Global Time Code operations, the upstream device interacts with the repeater and involves the repeaters GTC related registers. The repeater also involves these registers when it acts as GTC master and talks to the downstream device to involve the use of its GTC related registers.

In the column "sends access downstream", no number with checkmark implies that DP 1.2 Repeater passes down Native Aux Writes and Reads to the downstream device. Reads are combined with local DPCD data only if the box in "DP 1.2 Repeater Has Local" is checked. Writes will be passed downstream, and where applicable, have write data applied to local DPCD registers (box in "DP 1.2 Repeater Snoops Writes" is checked).

"2" with checkmark implies that DP 1.2 Repeater passes down the information from write cycles to these registers only as part of an indirect process resulting from the cycle on the upstream interface. For example, the Repeater's LINK_BW_SET is written during Native Aux transfer on upstream interface during link training of the upstream interface. This same information will be used when training the downstream interface.

"3" with checkmark implies that DP 1.2 Repeater as well as the downstream device has the specific register and that access to the registers is not transparent. See previous table footnote for more info.

TABLE

DP 1.2 Repeater (Repeater without Video Branching Unit) - DPCD Handling From Upstream Side

| Address | DPCD Register | Has local DPCD for this reg. | DP 1.2 Repeater handles DPCD Access for specific register Sends access Downstream | Snoops Writes to this reg. | Comment |
|---------|---------------|------------------------------|------------------------------------------------------------------------------------|----------------------------|---------|
| *Receiver Capability Field* | | | | | |
| 00000H | DPCD_REV | ☒ | | | These registers are in both the DP 1.2 Repeater and in the downstream device. Reads are a combination of the lowest common capability between the DP 1.2 Repeater and the downstream device. For example, if the lane count of the downstream device is 2 then a read from MAX_LANE_COUNT will return 2. |
| 00001H | MAX_LINK_RATE | ☒ | | | |
| 00002H | MAX_LANE_COUNT | ☒ | ☒ | | |
| 00003H | MAX_DOWNSPREAD | ☒ | ☒ | | |
| 00004H | NORP | | | | These registers are contained only in the downstream device. Therefore accesses are passed to the downstream device without DP 1.2 Repeater interpreting what's in the contents of the read or write data. |
| 00005H | DOWNSTREAMPORT_PRESENT | | ☒ | | |
| 00006H | MAIN_LINK_CHANNEL_CODING | | ☒ | | |
| 00007H | DOWN_STREAM_PORT_COUNT | | ☒ | | |
| 00008H | RECEIVE_PORT0_CAP_0 | | ☒ | | |
| 00009H | RECEIVE_PORT0_CAP_1 | | ☒ | | |
| 0000AH | RECEIVE_PORT1_CAP_0 | | ☒ | | |
| 0000BH | RECEIVE_PORT1_CAP_1 | | ☒ | | |
| 0000CH | I2C_SPEED_CONTROL_CAP | | ☒ | | |
| 0000DH | EDP_CONFIGURATION_CAP | | ☒ | | |
| 0000EH | TRAINING_AUX_RD_INTERVAL | ☒ | | | The TRAINING_AUX_RD_INTERVAL register is involved in training of the upstream link so is contained in the DP 1.2 Repeater. All accesses to this register are to the DP 1.2 Repeater and are not passed downstream. |
| 0000FH | ADAPTER_CAP | | ☒ | | The ADAPTER_CAP register is only contained in the downstream device. Therefore accesses are passed to the |

TABLE-continued

DP 1.2 Repeater (Repeater without Video Branching Unit) - DPCD Handling From Upstream Side

| Address | DPCD Register | Has local DPCD for this reg. | DP 1.2 Repeater handles DPCD Access for specific register Sends access Down-stream | Snoops Writes to this reg. | Comment |
|---|---|---|---|---|---|
| | Register | | | | downstream device without the DP 1.2 Repeater interpreting what's in the contents of the read data. |
| 00010H-0001FH | RESERVED | | ☒ | | All reserved registers assumed to be only in the downstream device. |
| 00020H | FAUX_CAP | ☒ | ☒ | | The FAUX_CAP register is contained in both the DP 1.2 Repeater and in the downstream device. Reads are a combination of the lowest common capability between the DP 1.2 Repeater and the downstream device. |
| 00021H | MSTM_CAP | | ☒ | | These registers are contained only in the downstream device. Therefore accesses are passed to the downstream device without a DP 1.2 Repeater interpreting what's in the contents of the read data. Since a DP 1.2 Repeater does not get involved in Messaging Transactions at the packet level, all messaging is transparent. Therefore MSTM_CAP is not in a DP 1.2 Repeater but the downstream device. |
| 00022H | NUMBER_OF_AUDIO_ENDPOINTS | | ☒ | | |
| 00023H-0002DH | AV_SYNC_DATA_BLOCK | ☒ | ☒ | | The AV_SYNC_DATA_BLOCK registers are contained in both the DP 1.2 Repeater and in the downstream device. Reads are a combination of the information in both devices. Since the Repeater will most likely not introduce any delay between the audio and video, |

TABLE-continued

DP 1.2 Repeater (Repeater without Video Branching Unit) - DPCD Handling From Upstream Side

| Address | DPCD Register | | Has local DPCD for this reg. | Sends access Down-stream | Snoops Writes to this reg. | Comment |
| --- | --- | --- | --- | --- | --- | --- |
| | Register | | | | | |
| | | | | | | these registers will probably come solely from the downstream device. |
| 0002EH-0002FH | RESERVED | | | | | All reserved registers assumed to be only in the downstream device. |
| 00030H-0003FH | GUID | | | ☒ | | The GUID register for this simple repeater device is assumed to be contained only in the downstream device. Therefore accesses are passed to the downstream device without a DP 1.2 Repeater interpreting what's in the contents of the read data. |
| 00040H-00053H | RESERVED | | | ☒ | | All reserved registers assumed to be only in the downstream device. |
| 00054H-00057H | RX_GTC_VALUE | | ☒[1] | | | These registers are both in the repeater and the downstream device. |
| 00058H | RX_GTC_MSTR_REQ | | ☒[1] | ☒[3] | | |
| 00059H | RX_GTC_FREQ_LOCK_DONE | | ☒[1] | ☒[3] | | Access to the registers is not transparent. For example, during Global Time Code operations, the upstream device interacts with the repeater and involves the repeaters GTC related registers. The repeater also utilizes these registers when it acts as GTC master and talks to the downstream device to involve the use of the downstream device's GTC related registers. |
| 0005AH-0007FH | RESERVED | | | ☒ | | All reserved registers assumed to be only in the downstream device. |
| 00080H-0008FH | DETAILED_CAP_INFO_AVAILABLE | | | ☒ | | The Detailed Cap Info Available registers are contained only in |

TABLE-continued

DP 1.2 Repeater (Repeater without Video Branching Unit) - DPCD Handling From Upstream Side

| Address | DPCD Register | Has local DPCD for this reg. | Sends access Down-stream | Snoops Writes to this reg. | Comment |
|---|---|---|---|---|---|
| 00090H-000FFH | RESERVED | | ☒ | | the downstream device. Therefore accesses are passed to the downstream device without a DP 1.2 Repeater interpreting what's in the contents of the read data. All reserved registers assumed to be only in the downstream device. |
| Link Configuration Field | | | | | |
| 00100H | LINK_BW_SET | ☒ | | ☒² | The LINK_BW_SET and LANE_COUNT_SET registers are involved in training of the upstream link so are contained in the DP 1.2 Repeater. All accesses to this register are to the DP 1.2 Repeater and are not passed downstream. The write data is indirectly passed to the downstream device as a result of the training of the downstream link, i.e. repeater trains downstream link to same configuration as upstream link. |
| 00101H | LANE_COUNT_SET | ☒ | | ☒² | |
| 00102H | TRAINING_PATTERN_SET | ☒ | | | These registers are involved in training of the upstream link so are contained in DP 1.2 Repeater. All accesses to these registers are to the DP 1.2 Repeater and are not passed downstream except where noted below. If downstream device is 1.1a compliant only, then bits 3:2 of TRAINING_PATTERN_SET are treated as link quality measurement control and so are treated the same as the LINK_QUAL_LANEx_SET |
| 00103H | TRAINING_LANE0_SET | ☒ | | | |
| 00104H | TRAINING_LANE1_SET | ☒ | | | |
| 00105H | TRAINING_LANE2_SET | ☒ | | | |
| 00106H | TRAINING_LANE3_SET | ☒ | | | |
| 00107H | DOWNSPREAD_CTRL | ☒ | | ☒² | |
| 00108H | MAIN_LINK_CHANNEL_CODING_SET | ☒ | | | |

TABLE-continued

DP 1.2 Repeater (Repeater without Video Branching Unit) - DPCD Handling From Upstream Side

| | | DP 1.2 Repeater handles DPCD Access for specific register | | | |
|---|---|---|---|---|---|
| Address | DPCD Register | Has local DPCD for this reg. | Sends access Downstream | Snoops Writes to this reg. | Comment |
| 00109H | I2C_SPEED_CONTROL | | | | registers as far as DPCD handling. Bits 7:6 of TRAINING_PATTERN_SET are used for both link training and link quality measurement. Therefore during link training the repeater's registers will be accessed. After link training the downstream device's register bits will be accessed. |
| 0010AH | EDP_CONFIGURATION_SET | | ☒ | | These registers are contained only in the downstream device. Therefore accesses are passed to the downstream device without the DP 1.2 Repeater interpreting what's in the contents of the data. |
| 0010BH | LINK_QUAL_LANE0_SET | ☒ | ☒ | ☒ | These registers are involved in total link quality measurements and so are in a DP 1.2 Repeater as well as the downstream device. Accesses to these registers by the upstream device are snooped by the repeater (i.e., applied to its local registers) and passed directly to the downstream device. When link quality measurement testing is active on the upstream link the Repeater should forward the main link traffic to the downstream device |
| 0010CH | LINK_QUAL_LANE1_SET | ☒ | ☒ | ☒ | |
| 0010DH | LINK_QUAL_LANE2_SET | ☒ | ☒ | ☒ | |
| 0010EH | LINK_QUAL_LANE3_SET | ☒ | ☒ | ☒ | |
| 0010FH | TRAINING_LANE0_1_SET2 | ☒ | | | These registers are involved in training of the upstream link so are contained in DP 1.2 Repeater. All accesses to these registers are to DP 1.2 |
| 00110H | TRAINING_LANE2_3_SET2 | ☒ | | | |

TABLE-continued

DP 1.2 Repeater (Repeater without Video Branching Unit) - DPCD Handling From Upstream Side

| Address | DPCD Register | | Has local DPCD for this reg. | Sends access Down-stream | Snoops Writes to this reg. | Comment |
|---|---|---|---|---|---|---|
| | Register | | | | | |
| 00111H | MSTM_CTRL | | | ☒ | | Repeater and are not passed downstream. |
| 00112H-00114H | AUDIO_DELAY | | | ☒ | | These registers are contained only in the downstream device. Therefore accesses are passed to the downstream device without the DP 1.2 Repeater interpreting what's in the contents of the data. Since a DP 1.2 Repeater does not get involved in Messaging Transactions at the packet level, all messaging is transparent. Therefore MSTM_CTRL is not in the DP 1.2 Repeater but the downstream device. |
| 00115H-00117H | RESERVED | | | ☒ | | All reserved registers assumed to be only in the downstream device. |
| 00118H | UPSTREAM_DEVICE_DP_PWR_NEED | | ☒ | | | This register needs to be in DP 1.2 Repeater and accesses to it by the upstream device should stay to the DP 1.2 Repeater register. Implementation is dependent on specific requirements for product. |
| 00119H-0011FH | RESERVED | | | ☒ | | All reserved registers assumed to be only in the downstream device. |
| 00120H | FAUX_MODE_CTRL | | ☒ | ☒ | | Handling depends on if Repeater supports Faux. |
| 00121H | FAUX_FORWARD_CHANNEL_DRIVE_SET | | ☒ | ☒ | | If either the repeater or the downstream device does not support Faux then accesses to these registers should not be passed down to the downstream device. Native Aux Writes should return Aux_Nack and reads should return |
| 00122H | FAUX_BACK_CHANNEL_STATUS | | ☒ | ☒ | | |
| 00123H-00124H | FAUX_BACK_CHANNEL_SYMBOL_ERROR_COUNT | | ☒ | ☒ | | |
| 00125H | FAUX_BACK_CHANNEL_TRAINING_PATTERN_TIME | | ☒ | ☒ | | |

TABLE-continued

DP 1.2 Repeater (Repeater without Video Branching Unit) - DPCD Handling From Upstream Side

| Address | DPCD Register | Has local DPCD for this reg. | Sends access Downstream | Snoops Writes to this reg. | Comment |
|---|---|---|---|---|---|
| 00126H-00153H | RESERVED | | ☑ | | Aux_Ack with 0's for read data. If both the repeater and the downstream device support Fast Aux then all FAUX related DPCD registers are considered local. Therefore, all access by the upstream device to the FAUX related registers is handled by the Repeater using its internal DPCD space. Training of the upstream FAUX link by the upstream source involves access to the Repeaters FAUX related DPCD registers. When the Repeater trains the downstream FAUX link then it accesses the FAUX related DPCD registers of the downstream device. All reserved registers assumed to be only in the downstream device. |
| 00154H-00157H | TX_GTC_VALUE | ☑¹ | ☑³ | | Access to the registers is not transparent. For example, during Global Time Code operations, the upstream device interacts with the repeater and involves the repeaters GTC related registers. The repeater also utilizes these registers when it acts as GTC master and talks to the downstream device to involve the use of the downstream device's GTC related registers |
| 00158H | RX_GTC_VALUE_PHASE_SKEW_EN | ☑¹ | ☑³ | | |
| 00159H | TX_GTC_FREQ_LOCK_DONE | ☑¹ | ☑³ | | |
| 0015AH-0019FH | RESERVED | | ☑ | | All reserved registers assumed to be only in the downstream device. |

TABLE-continued

DP 1.2 Repeater (Repeater without Video Branching Unit) - DPCD Handling From Upstream Side

| Address | DPCD Register | Has local DPCD for this reg. | Sends access Downstream | Snoops Writes to this reg. | Comment |
|---|---|---|---|---|---|
| 001A0H | ADAPTER_CTRL | | ☑ | | This register is contained only in the downstream device. Therefore accesses are passed to the downstream device without the DP 1.2 Repeater interpreting what's in the contents of the data. |
| 001A1H | BRANCH_DEVICE_CTRL | | ☑ | | The BRANCH_DEVICE_CTRL register is not needed by a DP 1.2 repeater. Therefore accesses to it are passed to the downstream device without the DP 1.2 Repeater interpreting what's in the contents of the read or write data. |
| 001A2H-001BFH | RESERVED | | ☑ | | All reserved registers assumed to be only in the downstream device. |
| 001C0H | PAYLOAD_ALLOCATE_SET | | ☑ | | These registers are not needed by a DP 1.2 Repeater since it is not aware of Multistream Transport and handles it transparently. These registers are contained only in the downstream device. Therefore accesses are passed to the downstream device without the DP 1.2 Repeater interpreting what's in the contents of the read or write data. |
| 001C1H | PAYLOAD_ALLOCATE_START_TIME_SLOT | | ☑ | | |
| 001C2H | PAYLOAD_ALLOCATE_TIME_SLOT_COUNT | | ☑ | | |
| 001C3H-001FFH | RESERVED | | ☑ | | All reserved registers assumed to be only in the downstream device. |

Link/Sink Status Field

| Address | DPCD Register | Has local DPCD for this reg. | Sends access Downstream | Snoops Writes to this reg. | Comment |
|---|---|---|---|---|---|
| 00200H | SINK_COUNT | | ☑ | | The SINK_COUNT register is contained only in the downstream device. Therefore accesses are passed to the downstream device without the |

TABLE-continued

DP 1.2 Repeater (Repeater without Video Branching Unit) - DPCD Handling From Upstream Side

| Address | DPCD Register | Has local DPCD for this reg. | DP 1.2 Repeater handles DPCD Access for specific register — Sends access Downstream | Snoops Writes to this reg. | Comment |
|---|---|---|---|---|---|
| 00201H | DEVICE_SERVICE_IRQ_VECTOR | | ☒ | | DP 1.2 Repeater interpreting what's in the contents of the read data. This register is contained only in the downstream device. I don't think DP 1.2 Repeater has any of the information for any of the bits locally. Therefore accesses are passed to the downstream device without the DP 1.2 Repeater interpreting what's in the contents of the read or write data. When the downstream device pulses HPD to signal an IRQ_HPD the DP 1.2 Repeater simply regenerates the IRQ_HPD on the upstream interface. |
| 00202H | LANE0_1_STATUS | ☒ | ☒ | | These registers are involved in training of the upstream link and so are contained in DP 1.2 Repeater. All accesses to these registers during link training are to the DP 1.2 Repeater and are not passed downstream. After training has completed, however, accesses to these registers is passed to the downstream device. That way if the downstream device loses lock, the status is communicated directly to the upstream device. |
| 00203H | LANE2_3_STATUS | ☒ | ☒ | | |
| 00204H | LANE_ALIGN_STATUS_UPDATED | ☒ | ☒ | | |
| 00205H | SINK_STATUS | | ☒ | | I believe the SINK_STATUS register is only contained in the downstream device. Therefore accesses are passed to the downstream device without the DP 1.2 Repeater interpreting |

TABLE-continued

DP 1.2 Repeater (Repeater without Video Branching Unit) - DPCD Handling From Upstream Side

| Address | DPCD Register | Has local DPCD for this reg. | DP 1.2 Repeater handles DPCD Access for specific register — Sends access Downstream | Snoops Writes to this reg. | Comment |
|---|---|---|---|---|---|
| | | | | | what's in the contents of the read data. |
| 00206H | ADJUST_REQUEST_LANE0_1 | ☒ | | | These registers are involved in training of the upstream link and so are contained in the DP 1.2 Repeater. All accesses to these registers are to the DP 1.2 Repeater and are not passed downstream. |
| 00207H | ADJUST_REQUEST_LANE2_3 | ☒ | | | |
| 00208H | TRAINING_SCORE_LANE0 | ☒ | | | These registers are sink implementation dependant. |
| 00209H | TRAINING_SCORE_LANE1 | ☒ | | | |
| 0020AH | TRAINING_SCORE_LANE2 | ☒ | | | They are involved in training of the upstream link or link quality measurements of the upstream link and so are contained in the DP 1.2 Repeater. All accesses to these registers are to DP 1.2 Repeater and are not passed downstream. |
| 0020BH | TRAINING_SCORE_LANE3 | ☒ | | | |
| 0020CH | ADJUST_REQUEST_POST_CURSOR2 | ☒ | | | This register is involved in training of the upstream link so is contained in the DP 1.2 Repeater. All accesses to this register are to the DP 1.2 Repeater and are not passed downstream. |
| 0020DH-0020EH | FAUX_FORWARD_CHANNEL_SYMBOL_ERROR_COUNT | ☒ | ☒ | | Handling depends on if Repeater supports Faux. If either the repeater or the downstream device does not support Aux then accesses to this register should not be passed down to the downstream device. Native Aux Reads should return Aux_Ack with 0's for read data. If both the repeater and the downstream device support Fast Aux then all FAUX related DPCD registers are considered |

TABLE-continued

DP 1.2 Repeater (Repeater without Video Branching Unit) - DPCD Handling From Upstream Side

| Address | DPCD Register | Has local DPCD for this reg. | Sends access Downstream | Snoops Writes to this reg. | Comment |
|---|---|---|---|---|---|
| | | | | | local. Therefore, all access by the upstream device to the FAUX related registers is handled by the Repeater using its internal DPCD space. Training of the upstream FAUX link by the upstream device involves access to the Repeaters FAUX related DPCD registers. When the Repeater trains the downstream FAUX link then it accesses the FAUX related DPCD registers of the downstream device. |
| 0020FH | RESERVED | | ☒ | | All reserved registers assumed to be only in the downstream device. |
| 00210H-00211H | SYMBOL_ERROR_COUNT_LANE0 | ☒ | ☒ | | These registers are used for link training and link quality measurements. During link training access to these registers is to the DP 1.2 Repeater registers and are not passed down to the downstream device. After link training, accesses are passed to the downstream device. |
| 00212H-00213H | SYMBOL_ERROR_COUNT_LANE1 | ☒ | ☒ | | |
| 00214H-00215H | SYMBOL_ERROR_COUNT_LANE2 | ☒ | ☒ | | |
| 00216H-00217H | SYMBOL_ERROR_COUNT_LANE3 | ☒ | ☒ | | |
| Automated Testing Sub Field | | | | | |
| 00218H | TEST_REQUEST | ☒ | ☒ | | Support for the Test Automation Registers is optional. If a repeater supports these registers then accesses are to the repeater's registers. Otherwise accesses will be passed down to the |
| 00219H | TEST_LINK_RATE | ☒ | ☒ | | |
| 0021AH-0021FH | RESERVED | | ☒ | | |
| 00220H | TEST_LANE_COUNT | ☒ | ☒ | | |
| 00211H | TEST_PATTERN | ☒ | ☒ | | |
| 00222H-00223H | TEST_H_TOTAL | ☒ | ☒ | | |
| 00224H-00225H | TEST_V_TOTAL | ☒ | ☒ | | |
| 00226H-00227H | TEST_H_START | ☒ | ☒ | | |

TABLE-continued

DP 1.2 Repeater (Repeater without Video Branching Unit) - DPCD Handling From Upstream Side

| Address | DPCD Register | | Has local DPCD for this reg. | Sends access Downstream | Snoops Writes to this reg. | Comment |
|---|---|---|---|---|---|---|
| | | Register | | | | |
| 0028H-0029H | TEST_V_START | | | | | downstream interface. |
| 002AH-002BH | TEST_HSYNC | | | ☒ | | |
| 002CH-002DH | TEST_VSYNC | | | ☒ | | |
| 002EH-002FH | TEST_H_WIDTH | | | ☒ | | Support for the Test Automation Registers is |
| 0030H-0031H | TEST_V_HEIGHT | | | ☒ | | optional. |
| 0032H-0033H | TEST_MISC | | | ☒ | | If a repeater supports these |
| 0034H | TEST_REFRESH_RATE_NUMERATOR | | | ☒ | | registers then accesses are to |
| 0035H-023FH | RESERVED | | | | | the repeater's registers. |
| 0240H-0241H | TEST_CRC_R_CR | | | ☒ | | Otherwise accesses will be |
| 0242H-0243H | TEST_CRC_G_Y | | | ☒ | | passed down to the |
| 0244H-0245H | TEST_CRC_B_CB | | | ☒ | | downstream interface. |
| 0246H | TEST_SINK_MISC | | | ☒ | | Exceptions to this would be the |
| 0247H | PHY_TEST_PATTERN | | | ☒ | | HBR2_COMPLIANCE_SCRAMBLER_RESET |
| 0249H | TEST_FAUX | | | ☒ | | and |
| 024AH-024BH | HBR2_COMPLIANCE_SCRAMBLER_RESET | | | ☒ | ☒ | TEST_80BIT_CUSTOM_PATTERN |
| 024CH-024FH | RESERVED | | | | | registers. Since these |
| 0250H-0259H | TEST_80BIT_CUSTOM_PATTERN | | | ☒ | ☒ | registers define the operation of |
| 025AH-025FH | RESERVED | | | | | the HBR2 Compliance Eye |
| 0260H | TEST_RESPONSE | | | ☒ | | Pattern and 80 Bit Custom |
| 0261H | TEST_EDID_CHECKSUM | | | ☒ | | Pattern during Link Quality |
| 0262H | TEST_FAUX_BACK_CHANNEL_TEST_PATTERN | | | ☒ | | Measurement Testing, then the |
| 0263H-0266FH | RESERVED | | | | | Repeater should handle these |
| 0270H | TEST_SINK | | | ☒ | | register the same as it handles |
| 0271H-027FH | RESERVED | | | | | the LINK_QUAL_LANE0_SET register. |
| | | Un-Named Field as of DP 1.2 | | | | |
| 0280H | FAUX_FORWARD_CHANNEL_STATUS | | ☒ | ☒ | | Handling depends on if Repeater supports Faux. |
| 0281H | FAUX_BACK_CHANNEL_DRIVE_SET | | ☒ | ☒ | | If either the repeater or the |
| 0282H | FAUX_BACK_CHANNEL_SYMBOL_ERROR_COUNT_CONTROL | | ☒ | ☒ | | downstream device does not support Aux then accesses to these registers should not be passed down to the downstream device. Native Aux reads should return Aux_Ack with 0's for read data. |

TABLE-continued

DP 1.2 Repeater (Repeater without Video Branching Unit) - DPCD Handling From Upstream Side

| Address | DPCD Register | Has local DPCD for this reg. | Sends access Down-stream | Snoops Writes to this reg. | Comment |
|---|---|---|---|---|---|
| | | | | | If both the repeater and the downstream device support Fast Aux then all FAUX related DPCD registers are considered local. Therefore, all access by the upstream device to the FAUX related registers is handled by the Repeater using its internal DPCD space. Training of the upstream FAUX link by the upstream device involves access to the Repeaters FAUX related DPCD registers. When the Repeater trains the downstream FAUX link then it accesses the FAUX related DPCD registers of the downstream device. |
| 00283H-002BFH | RESERVED | | ☒ | | All reserved registers assumed to be only in the downstream device. |
| 002C0H | PAYLOAD_TABLE_UPDATE_STATUS | | ☒ | | These registers are not needed by a DP 1.2 Repeater since it is not aware of Multistream Transport and handles it transparently. These registers are contained only in the downstream device. Therefore accesses are passed to the downstream device without the DP 1.2 Repeater interpreting what's in the contents of the read or write data. |
| 002C1H-002FFH | VC_PAYLOAD_ID_SLOT n | | ☒ | | |
| | Source Device Specific Field | | | | |
| 00300H-0302H | SOURCE_IEEE_OUI | | ☒ | | SOURCE_OUI register accesses are passed to the downstream device. Use of |
| 00303H-00308H | SOURCE DEVICE ID STRING | | ☒ | | |
| 00309H | SOURCE HW REVISION | | ☒ | | |

TABLE-continued

DP 1.2 Repeater (Repeater without Video Branching Unit) - DPCD Handling From Upstream Side

| Address | DPCD Register | | DP 1.2 Repeater handles DPCD Access for specific register | | | Comment |
|---|---|---|---|---|---|---|
| | | Register | Has local DPCD for this reg. | Sends access Downstream | Snoops Writes to this reg. | |
| 0030AH-0030BH | SOURCE FW REVISION | | | ☑ | | these registers is implementation dependent for a DP 1.2 Repeater. |
| 0030CH-003FFH | RESERVED | | | ☑ | | All reserved registers assumed to be only in the downstream device. |
| | | Sink Device Specific Field | | | | |
| 00400H-00402H | SINK_IEEE_OUI | | | ☑ | | SINK_OUI register accesses are passed to the downstream device. |
| 00403H-00408H | SINK DEVICE ID STRING | | | ☑ | | |
| 00409H | SINK HW REVISION | | | ☑ | | |
| 0040AH-0040BH | SINK FW REVISION | | | ☑ | | Use of these registers is implementation dependent for a DP 1.2 Repeater. |
| 0040CH-004FFH | RESERVED | | | ☑ | | All reserved registers assumed to be only in the downstream device. |
| | | Branch Device Specific Field | | | | |
| 00500H-00502H | BRANCH_IEEE_OUI | | | ☑ | | BRANCH_OUI register accesses are passed to the downstream device. |
| 00503H-00508H | BRANCH DEVICE ID STRING | | | ☑ | | |
| 00509H | BRANCH HW REVISION | | | ☑ | | |
| 0050AH-0050BH | BRANCH FW REVISION | | | ☑ | | Use of these registers is implementation dependent for a DP 1.2 Repeater. |
| 0050CH-005FFH | RESERVED | | | ☑ | | All reserved registers assumed to be only in the downstream device. |
| | | Sink Control Field | | | | |
| 00600H | SET_POWER | | ☑ | ☑ | ☑ | The SET_POWER register is located in both the DP 1.2 Repeater and the downstream device. A DP 1.2 Repeater passes access to this register downstream but snoops write and reads to update its local register. |

TABLE-continued

| | | DP 1.2 Repeater (Repeater without Video Branching Unit) - DPCD Handling From Upstream Side | | | |
|---|---|---|---|---|---|
| | | | DP 1.2 Repeater handles DPCD Access for specific register | | |
| Address | DPCD Register Register | Has local DPCD for this reg. | Sends access Down-stream | Snoops Writes to this reg. | Comment |
| 00601H-00FFFH | RESERVED | | ☒ | | All reserved registers assumed to be only in the downstream device. |
| | Sideband MSG Buffers | | | | |
| 01000H-011FFH | DOWN_REQ | | | ☒ | The DOWN_REQ and UP_REP register spaces are used by the Upstream device to pass messages to its downstream neighbor. But since a DP 1.2 Repeater does not directly handle messaging, these accesses are passed downstream without the DP 1.2 Repeater interpreting what's in the contents of the read or write data. |
| 01200H-035FFH | UP_REP | | ☒ | ☒ | |
| 01400H-015FFH | DOWN_REP | | | ☒ | The DOWN_REP and UP_REQ register spaces are used by the downstream device to pass messages to its upstream neighbor (DP 1.2 Repeater's upstream device). But a since DP 1.2 Repeater does not directly handle messaging, these accesses are passed downstream without DP 1.2 Repeater interpreting what's in the contents of the read data. These registers are read by the Upstream device as follows. 1) The downstream device updates its DPCD with the appropriate sideband message data (upstream reply or downstream request), 2) The downstream device pulses HPD to send an IRQ_HPD, 3) DP 1.2 Repeater pulses its upstream HPD to send and |
| 01600H-017FFH | UP_REQ | | ☒ | ☒ | |

TABLE-continued

DP 1.2 Repeater (Repeater without Video Branching Unit) - DPCD Handling From Upstream Side

| Address | DPCD Register | Has local DPCD for this reg. | DP 1.2 Repeater handles DPCD Access for specific register — Sends access Downstream | Snoops Writes to this reg. | Comment |
|---|---|---|---|---|---|
| | | | | | IRQ_HPD, 4) the upstream device reads DPCD space as specified in the DP spec and eventually reads the DOWN_REQ or UP_REP space. |
| 02000H-02001H | RESERVED—USB OVER AUX | | ☑ | | All reserved registers assumed to be only in the downstream device. The RESERVED - USB OVER AUX space is not defined as of yet, but accesses will be passed downstream. |
| | ESI (Event Status Indicator) Field | | | | The ESI space is contained only in the downstream device. Therefore accesses are passed to the downstream device without the DP 1.2 Repeater interpreting what's in the contents of the read or write data. |
| 02002H | SINK_COUNT_ESI | | ☑ | | |
| 02003H | DEVICE_SERVICE_IRQ_VECTOR_ESI0 | | ☑ | | |
| 02004H | DEVICE_SEREVICE_IRQ_VECTOR_ESI1 | | ☑ | | |
| 02005H | LINK_SERVICE_IRQ_VECTOR_ESI0 | | ☑ | | |
| 02006H-0200BH | RESERVED | | ☑ | | All reserved registers assumed to be only in the downstream device. |
| 0200CH | LANE0_1_STATUS_ESI | ☑ | ☑ | | The LaneX_X_STATUS_ESI through SINK_STATUS_ESI registers are handled just like the LANE_X_X_STATUS through SINK_STATUS registers (00202H-00205H) |
| 0200DH | LANE2_3_STATUS_ESI | ☑ | ☑ | | |
| 0200EH | LANE_ALIGN_STATUS_UPDATED_ESI | ☑ | ☑ | | |
| 0200FH | SINK_STATUS_ESI | | ☑ | | |
| 02010H-7FFFF | RESERVED | | ☑ | | All reserved registers assumed to be only in the downstream device. |

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

Numerous other embodiments of the disclosure will be apparent to persons skilled in the art without departing from the spirit and scope of the invention as defined in the appended claims.

The invention claimed is:

1. A DisplayPort repeater circuit, comprising:
an upstream data interface;
a downstream data interface;
a plurality of DisplayPort configuration data (DPCD) registers, and
a control circuit coupled to the upstream data interface, the downstream data interface, and the plurality of DPCD registers, the control circuit configured to:
process DPCD access transactions received from the upstream data interface, which are included in a first list of DPCD access transactions, by accessing one or more of the plurality of DPCD registers; and
process DPCD access transactions received from the upstream data interface, which are included in a second list of DPCD access transactions, by providing a transparent communication path to forward the transactions to the downstream data interface.

2. The DisplayPort repeater circuit of claim 1, wherein the control circuit is further configured to:
train one or more communication links on the upstream data interface and one or more communication links on the downstream data interface;
while training the communication links on the upstream and downstream data interfaces, process DPCD access transactions received from the upstream data interface, which are included in a list of link-training transactions, by accessing one or more of the plurality of DPCD registers; and
after training of the communication links on the upstream and downstream data interfaces, process DPCD access transactions received from the upstream data interface, which are included in the list of link-training transactions, by forwarding the DPCD access transactions to the downstream data interface.

3. The DisplayPort repeater circuit of claim 2, wherein:
training the communication links on the upstream and downstream data interfaces sets the communication links to a first link rate; and
the control circuit is further configured to, in response to a failure to train one or more of the communication links on the upstream or downstream data interfaces, retrain the communication links on the upstream and downstream data interfaces to set the communication links to a second rate that is lower than the first rate.

4. The DisplayPort repeater circuit of claim 1, wherein the control circuit is further configured to provide a transparent communication path between an upstream device coupled to the upstream data interface and a downstream device coupled to the downstream data interface for one or more DPCD access transactions included in the second list of DPCD access transactions.

5. The DisplayPort repeater circuit of claim 1, wherein the second list of DPCD access transactions includes reserved DPCD access transactions.

6. The DisplayPort repeater circuit of claim 1, wherein the control circuit is further configured to, in response to receiving a DPCD access transaction to a DPCD register not supported by the repeater, provide a transparent communication path to forward the DPCD access transaction to the downstream data interface.

7. The DisplayPort repeater circuit of claim 6, wherein the symmetric links are configured to have the same link rate.

8. The DisplayPort repeater circuit of claim 2, wherein one or more DPCD access transactions are included in the first list of DPCD access transactions and one or more DPCD access transactions are included in the second list of DPCD access transactions.

9. The DisplayPort repeater circuit of claim 2, wherein training one or more communication links on the upstream data interface and one or more communication links on the downstream data interface configures the one or more links on the upstream and downstream data interfaces to comply with a DisplayPort link configuration supported by both the repeater circuit and the downstream device.

10. The DisplayPort repeater circuit of claim 9, wherein training the one or more communication links on the upstream data interface and the one or more communication links on the downstream data interface includes:
determining a DPCD register-space revision level, a link rate, a lane count, a max downspread, a training Aux Rd interval, and Fast-Aux capability of the DisplayPort repeater circuit; and
determining a DPCD register-space revision level, a link rate, a lane count, a max downspread, a training Aux Rd interval, and Fast-Aux capability of the downstream device.

11. The DisplayPort repeater circuit of claim 1, wherein the second list of DPCP access transactions includes DisplayPort Native Aux transactions to DPCD registers reserved for messaging.

12. The DisplayPort repeater of claim 1, wherein the second list of DPCD access transactions includes transactions to DPCD registers reserved for payload-bandwidth allocation related transactions and transactions to DPCD registers reserved for messaging.

13. The DisplayPort repeater of claim 1, wherein the second list of DPCD access transactions includes transactions to DPCD registers reserved for power management related transactions and transactions to DPCD registers reserved for messaging.

14. The DisplayPort repeater circuit of claim 13, wherein the control circuit is further configured to, in response to a power management transaction received from the upstream data interface, adjust a power management setting of the DisplayPort repeater circuit and update one or more of the plurality of DPCD registers.

15. The DisplayPort repeater circuit of claim 1, wherein the DisplayPort repeater is not assigned a global unique identifier.

16. A method of operating a DisplayPort repeater circuit, the method comprising:
determining a link configuration supported by both the repeater circuit and a downstream device coupled to the repeater circuit;
configuring an upstream link between the repeater circuit and an upstream device coupled to the repeater circuit, the configured upstream link providing the determined link configuration supported by both the repeater circuit and the downstream device;
configuring a link between the repeater circuit and the downstream device, the configured downstream and upstream links being symmetrical;

in response to receiving a DisplayPort configuration data (DPCD) access transaction from the upstream link, which requests access to a DPCD register included in a first list of DPCD registers, processing the DPCD access transaction by accessing one or more of a plurality of DPCD registers included in the repeater circuit; and in response to receiving a DPCD access transaction from the upstream link, which requests access to a DPCD register included in a second list of DPCD registers, processing the DisplayPort access transaction by providing a transparent communication path to the downstream link for the DPCD access transaction.

17. The method of claim 16, wherein configuring the upstream link and downstream link includes processing DPCD access transactions received from the upstream data interface, which are included in a list of link-training transactions, by accessing one or more of the plurality of DPCD registers included in the repeater circuit, the method further comprising:
  after the configuration of the upstream and downstream links and in response to receiving a DPCD access transaction, which is included in the list of link-training transactions, from the upstream link, processing the DPCD access transactions by providing a transparent communication path to the downstream link for the transactions.

18. The method of claim 16, wherein configuring the upstream and downstream links includes setting the upstream and downstream links to the same data rate.

19. The method of claim 17, wherein one or more DPCD registers are included in both the first list of DPCD registers and the second list of DPCD registers.

20. The method of claim 16, wherein the determining the link configuration supported by both the repeater circuit and a downstream device coupled to the repeater circuit includes:
  determining a DPCD register-space revision level, a link rate, a lane count, a max downspread, a training Aux Rd interval, and Fast-Aux capability of the repeater circuit; and
  determining a DPCD register-space revision level, a link rate, a lane count, a max downspread, a training Aux Rd interval, and Fast-Aux capability of the downstream device.

21. An article of manufacture, comprising, a processor-readable storage medium configured with configuration data that when executed by a processing integrated circuit (IC), cause the processing IC to operate as a repeater control circuit, the repeater control circuit configured to perform the steps including:
  determining a link configuration supported by both the repeater circuit and a downstream device coupled to the repeater circuit;
  configuring a link between the repeater circuit and an upstream device coupled to the repeater circuit, the configured upstream link providing the determined link configuration supported by both the repeater circuit and the downstream device;
  configuring a link between the repeater circuit and the downstream device, the configured downstream and upstream links being symmetrical;
  in response to receiving a DisplayPort configuration data (DPCD) access transaction from the upstream link, which requests access to a DPCD register included in a first list of DPCD registers, processing the DPCD access transaction by accessing one or more of a plurality of DPCD registers included in the repeater circuit; and
  in response to receiving a DPCD access transaction from the upstream link, which requests access to a DPCD register included in a second list of DPCD registers, processing the DisplayPort access transaction by providing a transparent communication path to the downstream link for the DPCD access transaction.

22. The article of manufacture of claim 21, wherein:
  the configuring the upstream link and downstream link includes processing DPCD access transactions received from the upstream data interface, which are included in a list of link-training transactions, by accessing one or more of the plurality of DPCD registers included in the repeater circuit; and
  the repeater control circuit is further configured to, following the configuration of the upstream and downstream links and in response to receiving a DPCD access transaction that is included in a list of link-training transactions, process the DPCD access transaction by providing a transparent communication path to the downstream link for the transaction.

23. A repeater circuit, comprising:
  an upstream data interface;
  a downstream data interface;
  a plurality of configuration data registers, and
  a control circuit coupled to the upstream data interface, downstream data interface and registers, the control circuit configured to:
    operate in a link-configuration mode by processing register access transactions related to link training, received from the upstream data interface, using one or more of the plurality of registers to configure a link for communicating between an upstream device coupled to the upstream data interface and a downstream device coupled to the downstream data interface; and
    for one or more register access transactions included in a first list of register access transactions, operate in a transparent-link-communication mode by providing a transparent communication path in the link between the upstream device coupled to the upstream data interface and the downstream device coupled to the sink data interface.

24. The repeater circuit of claim 23, wherein the providing the transparent communication path involves forwarding register access transactions received from the upstream data interface to the downstream data interface.

* * * * *